Figure 1:
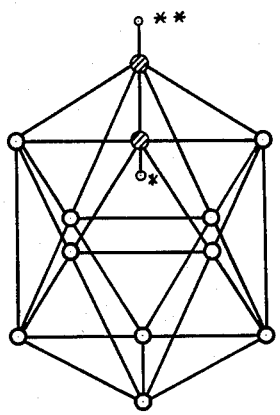

Feb. 11, 1964 T. L. HEYING 3,121,119
CARBORANE DIOLS AND PREPARATION THEREOF
Filed Dec. 26, 1961

O  BORON

⊘  CARBON o  HYDROGEN ON CARBON
   (HYDROGEN ATOMS ON BORON
     OMITTED FOR CLARITY)

FORMULA I

*INVENTOR:*
THEODORE L. HEYING
BY
*Walter D. Hunter*
AGENT

United States Patent Office — 3,121,119 — Patented Feb. 11, 1964

3,121,119
CARBORANE DIOLS AND PREPARATION THEREOF
Theodore L. Heying, North Haven, Conn., assignor to Olin Mathieson Chemical Corporation, a corporation of Virginia
Filed Dec. 26, 1961, Ser. No. 162,283
6 Claims. (Cl. 260—606.5)

This invention relates to carborane diols and to a method for their preparation. The drawing is a schematic illustration of the structural formula of carborane, $$B_{10}H_{10}(CHCH)$$

The novel compounds of this invention are prepared by the hydrolysis of organoboron compounds of the class $RR'B_{10}H_8(CR''CR''')$ wherein R and R' are selected from the class consisting of hydrogen and a lower alkyl radical containing 1 to 5 carbon atoms, wherein one of R'' and R''' is hydrogen and wherein one of R'' and R''' is a radical of the class

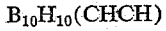

where n is an integer of from 0 to 6 inclusive.

Compounds of the above class can be prepared by reacting compounds of the type $RR'B_{10}H_8(CR''CR''')$ wherein R and R' are selected from the group consisting of hydrogen and a lower alkyl radical containing from 1 to 5 carbon atoms, wherein one of R'' and R''' is hydrogen and wherein one of R'' and R''' is an alkenyl radical containing from 2 to 8 carbon atoms, with hydrogen peroxide in the presence of a suitable catalyst. For example, the compound

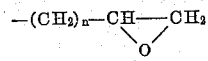

can be prepared by reacting hydrogen peroxide and $B_{10}H_{10}CHCCH_2CH=CH_2$ in methylene chloride and in the presence of disodium hydrogen phosphate and trifluoroacetic anhydride.

Compounds of the type $RR'B_{10}H_8(CR''CR''')$ wherein R and R' are selected from the group consisting of hydrogen and a lower alkyl radical containing from 1 to 5 carbon atoms, wherein one of R'' and R''' is hydrogen and wherein one of R'' and R''' is an alkenyl radical containing from 2 to 8 carbon atoms can be prepared according to the method described in application Serial No. 75,873, filed December 14, 1960, by Earl W. Cox and Theodore L. Heying. For example, $B_{10}H_{10}CHCCH_2CH=CH_2$ can be prepared by reacting $B_{10}H_{10}CHCH$ successively with phenyl lithium and allyl bromide at a temperature of 0° C. The compound $B_{10}H_{10}CHCH$ can be prepared in the manner described in application Serial No. 813,032, filed May 13, 1959, by John W. Ager, Jr., Theodore L. Heying and Donald J. Mangold.

The solid products prepared in accordance with the method of this invention, when incorporated with suitable oxidizers such as ammonium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxdizers are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

In accordance with this invention it was discovered that organoboron compounds of the above class can be hydrolyzed by water in the presence of a hydration catalyst to form carborane diols.

Suitable hydration catalysts include acids such as sulfuric, hydrochloric, phosphoric, oxalic, formic, acetic and trichloroacetic. Separation of the product from the reaction mixture is accomplished by extraction of the reaction mixture with, for example, a lower dialkyl ether followed by drying of the extract over magnesium sulfate and removal of the extracting agent.

The ratio of the reactants in the hydrolysis reaction of this invention can be varied widely generally being in the range of from about 50 to about 5000 moles of water or more per mole of organoboron compound of the above-mentioned class and preferably in the range of about 50 to about 1500 moles of water per mole of the organoboron compound employed. Generally, the amount of catalyst employed will be from about .005 to about 0.300 mole per mole of water charged to the reactor. The reactor temperature can vary widely from about 20° to about 150° C. although it is preferable to carry out the reaction under refluxing conditions. Although atmospheric reactions are convenient, the reaction pressure can vary from sub-atmospheric to several atmospheres, i.e., from 0.15 to 30 atmospheres. By analysis of the reaction mixture the degree of completion of the reaction can be determined. The reaction generally requires from about 0.5 to about 100 hours and preferably from about 5 to about 30 hours, depending upon the ratio of the reactants, the particular catalyst employed and the temperature of the reaction.

The process of the invention is illustrated in detail in the following example.

*Example 1*

1.5 grams of epoxyallylcarborane

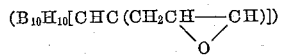

was refluxed for 16 hours in 50 ml. of 5 percent sulfuric acid. After cooling the mixture was extracted with ether and the extract was dried over magnesium sulfate, filtered and the ether removed. The resulting solid was transferred to a Soxhlet extractor and extracted with n-heptane for eight hours. Cooling the extract and filtering gave 1.4 grams, 86 percent of the theoretical yield, of

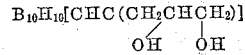

(beta, gamma-dihydroxypropylcarborane) a white product which had a melting point of 89–90° C.

The product was analyzed for carbon and hydrogen and the following results were obtained:

|  | Percent Carbon | Percent Hydrogen |
|---|---|---|
| Calc'd for $B_{10}H_{18}C_5O_2$ | 27.5 | 8.3 |
| Found | 27.3 | 8.5 |

The compound of the formula

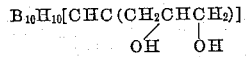

as described in Example I has the same structure formula as structural formula I shown in FIGURE 1 with the exception that the hydrogen atom indicated by the single asterisk is replaced by the radical

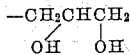

The boron-containing solid material produced by practicing the method of this invention can be employed as ingredients of solid propellant compositions in accordance with general procedures which are well-understood in the art, inasmuch as the solids produced by practicing the present process are readily oxidized using conventional solid oxidizers, such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and from 65 to 90 parts by weight of oxidizer, such as ammonium perchlorate, are present in the final propellant composition. In the propellant, the oxidizer and the product of the present process are formulated in intimate admixture with each other, as by finely subdividing each of the materials separately and thereafter intimately admixing them. The purpose in doing this, as the art is aware, is to provide proper burning characteristics in the final propellant. In addition to the oxidizer and the oxidizable material, the final propellant can also contain an artificial resin, generally of the urea-formaldehyde or phenol-formaldehyde type, the function of the resin being to give the propellant mechanical strength and at the same time improve its burning characteristics. Thus, in manufacturing a suitable propellant, proper proportions of finely divided oxidizer and finely divided boron-containing material can be admixed with a high solids content solution of a partially condensed urea-formaldehyde or phenol-formaldehyde resin, the proportions being such that the amount of the resin is about 5 to 10 percent by weight, based upon the weight of the oxidizer and boron compound. The ingredients are thoroughly mixed with simultaneous removal of the solvent, and following this the solvent-free mixture is molded into the desired shape, as by extrusion. Thereafter, the resin can be cured by resorting to heating at moderate temperatures. For further information concerning the formulation of solid propellant compositions, reference is made to U.S. Patent No. 2,622,277 to Bonnell et al. and U.S. Patent No. 2,646,596 to Thomas et al.

What is claimed is:

1. A method for the production of an organoboron diol which comprises hydrolyzing by reaction with water in the presence of a hydration catalyst selected from the group consisting of sulfuric, hydrochloric, phosphoric, oxalic, formic, acetic and trichloroacetic acid a compound of the formula $RR'B_{10}H_3(CR''CR''')$, wherein R and R' are selected from the group consisting of hydrogen and a lower alkyl radical containing from 1 to 5 carbon atoms, wherein one of R'' and R''' is hydrogen and wherein one of R'' and R''' is a radical of the class

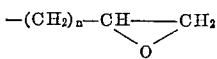

wherein $n$ is an integer of from 0 to 6 inclusive.

2. The method of claim 1 wherein the said compound is

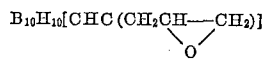

3. The method of claim 1 wherein the hydration catalyst is sulfuric acid.

4. The method of claim 1 wherein the said compound is

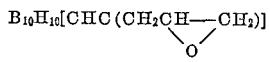

and the hydration catalyst is sulfuric acid.

5. $RR'B_{10}H_8(CR''CR''')$ wherein R and R' are each selected from the class consisting of hydrogen and an alkyl radical containing from 1 to 5 carbon atoms, wherein one of R'' and R''' is hydrogen and wherein one of R'' and R''' is a radical of the class

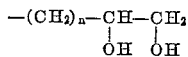

wherein $n$ is an integer of from 0 to 6 inclusive.

6.

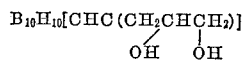

No references cited.

UNITED STATES PATENT OFFICE
CERTIFICATE OF CORRECTION

Patent No. 3,121,119                      February 11, 1964

Theodore L. Heying

It is hereby certified that error appears in the above numbered patent requiring correction and that the said Letters Patent should read as corrected below.

Column 2, line 20, for "reactor", second occurrence, read -- reaction --; column 4, line 7, for "$RR'B_{10}H_3$" read read -- $RR'B_{10}H_8$ --.

Signed and sealed this 7th day of July 1964.

(SEAL)
Attest:

ERNEST W. SWIDER                      EDWARD J. BRENNER
Attesting Officer                      Commissioner of Patents